United States Patent [19]
Kawasato et al.

[11] Patent Number: 5,482,768
[45] Date of Patent: Jan. 9, 1996

[54] SURFACE-TREATED SUBSTRATE AND PROCESS FOR ITS PRODUCTION

[75] Inventors: Takeshi Kawasato; Kazuya Hiratsuka; Takashige Yoneda; Tsuneo Wakabayashi; Fumiaki Gunji, all of Yokohama, Japan

[73] Assignee: Asahi Glass Company Ltd., Tokyo, Japan

[21] Appl. No.: 242,675

[22] Filed: May 13, 1994

[30] Foreign Application Priority Data

May 14, 1993 [JP] Japan .................................. 5-136580

[51] Int. Cl.$^6$ ........................... B32B 17/06; C09K 3/18
[52] U.S. Cl. .................. 428/327; 427/226; 428/428; 428/429; 428/447; 428/448
[58] Field of Search ........................... 428/327, 428, 428/429, 447, 448; 427/226

[56] References Cited

FOREIGN PATENT DOCUMENTS 0513690  11/1992  European Pat. Off. .
WO87/06161  10/1987  WIPO .

OTHER PUBLICATIONS

Derwent Abstracts, AN–90–251019, JP–2 175 630, Jul. 6, 1990.
Derwent Abstracts, AN 88-115470, JP-A-63 061 057, Mar. 17, 1988.
Chemical Abstracts, vol. 101, No. 4, Jul. 23, 1984, AN 27376, JP-A-59 26 944, Feb. 13, 1984.
Chemical Abstracts, vol. 104, No. 26, Jun. 30, 1986, AN 229299, JP-A-61 40 845, Feb. 27, 1986.

Primary Examiner—D. S. Nakarani
Attorney, Agent, or Firm—Oblon, Spivak, McClelland, Maier, & Neustadt

[57] ABSTRACT

A surface-treated substrate consisting essentially of a substrate having at least two treated surface layers wherein the first layer constituting the outermost layer among the treated surface layers is a layer formed by treating with a treating agent containing a compound (I) capable of forming a surface having a contact angle of at least 70° against water, and the second layer constituting an underlayer in contact with the outermost layer is a thin film layer of a heat resistant polymer formed by treating with a treating agent containing a compound (II) capable of forming a thin film of a heat resistant polymer and fine particles of a polymer, to form a thin film and heating the thin film to thermally decompose the fine particles of a polymer.

16 Claims, 1 Drawing Sheet

SURFACE-TREATED SUBSTRATE AND PROCESS FOR ITS PRODUCTION

TITLE OF THE INVENTION

1. Field of the Invention

The present invention relates to a substrate having a surface on which water drops scarcely attach or from which attached water drops can easily be removed.

2. Description of the Prior Art

Various substrates or various substrates having treated surface layers are used in various fields, and adverse effects brought about by water to the surface of such substrates are problematic.

For example, in transportation equipments such as electric cars, automobiles, ships or aircrafts, the surface of an exterior part such as an outer panel, a window glass, a mirror or a display surface material, an interior part such as an instrument panel, or other articles, is desired to be always clean. If rain drops, dusts or soils are attached, or moisture is condensed by an influence of the temperature or humidity in air, on the surface of an article in a transportation equipment, the outer appearance will be impaired. If such is a surface which is directly visually observed or a surface which is directly touched by a person, it may give an unpleasant feeling or may create a hygienic problem. Further, such may bring about a deterioration of the inherent function which the article for a transportation instrument has. Especially in a case where the article for the transportation equipment is an article for which transparency or see-through property is required (such as a window glass or a mirror), a deterioration of the transparency or see-through property may mean that the purpose intended by the article can not be attained, and may cause a serious accident.

A means to remove water drops (such as removal by wiping off or by means of a wiper) may sometimes impart fine scratch marks on the surface. Further, such scratch marks may sometimes be widened by foreign particles accompanying water drops. Furthermore, it is well known that when moisture is attached to a glass surface, glass components are likely to elute into the moisture, whereby the surface will be eroded, thus leading to so-called scorching. If the surface is strongly polished or abraded to remove this scorching, a fine roughness is likely to form. At the see-through portion made of glass having substantial scorching or a fine roughness on its surface, its basic function is lowered, and scattering of light on its surface is substantial, whereby it tends to be difficult to secure the field of view, and consequently there will be a problem in securing the safety.

Further, moisture is likely to give a hazardous influence to the surface of an article for a transportation instrument and to promote damages, soiling, yellowing or corrosion. Otherwise, it may induce a change in the electrical characteristics, the mechanical properties or the optical properties of the article for a transportation equipment. The adverse effects of this type brought by water are problematic not only in the field of articles for transportation equipments but also in various fields including articles for building or building decoration or articles for electric or electronic equipments.

Under these circumstances, it is desired to impart to the substrate surface a characteristic such that water drops scarcely attach to the substrate surface or attached water drops can easily be removed (such a characteristic will hereinafter be referred to simply as water repellency). Heretofore, to impart water repellency to a surface, surface treating agents for direct application, such as a surfactant and a silicone oil made of silicone wax or organo polysiloxane, have been proposed.

However, such surface treating agents require pretreatment for application in many cases, and have a problem that nonuniformity in application is likely to occur. Further, the adhesive properties of such treating agents to the substrates are rather poor, whereby the durability of the water repellency has been inadequate, and the application range has been rather limited.

The present invention has been accomplished in view of the above problems. Namely, during the course of the research and study for a treating agent which is capable of solving the drawbacks inherent to the conventional treating agents, the present inventors have found a treating agent which is applicable to various types of substrates and which exhibits excellent water repellency, and have confirmed that various substrates treated by such a treating agent are suitable for use as substrates having water repellency, particularly for transportation equipments or for building and building decoration. The present invention has been accomplished on the basis of these discoveries.

Accordingly, it is an object of the present invention to provide a substrate having water repellency, whereby such an effect lasts semipermanently with excellent abrasion resistance, chemical resistance and weather resistance.

SUMMARY OF THE INVENTION

The above object can be attained by the present invention which provides a surface-treated substrate consisting essentially of a substrate having at least two treated surface layers wherein the first layer constituting the outermost layer among the treated surface layers is a layer formed by treating with a treating agent containing a compound (I) capable of forming a surface having a contact angle of at least 70° against water, and the second layer constituting an underlayer in contact with the outermost layer is a thin film layer of a heat resistant polymer formed by treating with a treating agent containing a compound (II) capable of forming a thin film of a heat resistant polymer and fine particles of a polymer, to form a thin film and heating the thin film to thermally decompose the fine particles of a polymer.

DESCRIPTION OF THE PREFERRED EMBODIMENTS

Figure 1:
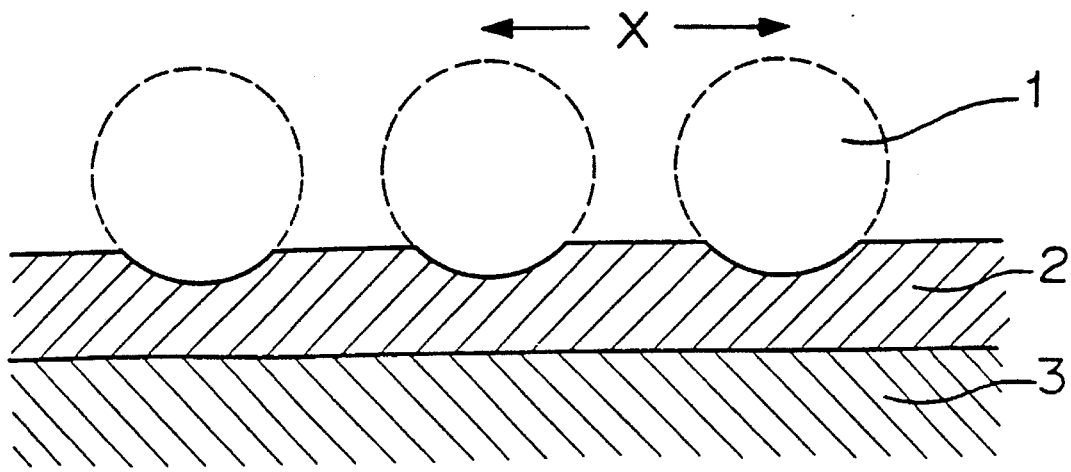

Now, the present invention will be described in detail with reference to the preferred embodiments.

In the present invention, the compound (I) capable of forming a surface having a contact angle of at least 70° against water (hereinafter referred to simply as the compound (I)) is a component essential to provide the water repellency and the stain-proofing property, and there is no particular restriction as to the structure of the compound (I). However, the one having a reactive group is preferred, when the adhesion to the second layer which will be described hereinafter, is taken into consideration. Here, the reactive group means e.g. a functional group such as a halogen group, an alkoxy group, an acyloxy group, an alkoxy-substituted alkoxy group, an aminoxy group, an amide group, an acid amide group, a ketoxymate group, a hydroxyl group, a mercapto group, an epoxy group, a glycidyl group, an unsaturated hydrocarbon group such as a vinyl group or an allyl group, or a carboxyl group, or a functional group having atoms capable of forming a hydrogen bond (such as oxygen atoms or nitrogen atoms).

The compound (I) has at least one hydrophobic organic group, since it is required to be a compound capable of forming a surface having a contact angle of at least 70° against water. As such a hydrophobic organic group, a long chain hydrocarbon group or an organic group having fluorine atoms is, for example, suitable.

As a result of extensive studies, it has been found that an isocyanate silane compound having at least one isocyanate group directly bonded to a silicon atom or a hydrolyzable silane compound having at least one hydrolyzable group directly bonded to a silicon atom, and having the above-mentioned hydrophobic organic group, is particularly effective as the compound (I) in the present invention.

Hereinafter, "the reactive silane compound" is used to generally represent both "the hydrolyzable silane compound" and "the isocyanate silane compound" as described below.

"The hydrolyzable silane compound" is a compound having at least one hydrolyzable group bonded to a silicon atom.

"The isocyanate silane compound" is a compound having at least one isocyanate group bonded to a silicon atom.

It is possible to consider that "the isocyanate group" is one type of "the hydrolyzable group" (namely, the isocyanate group bonded to a silicon atom may be regarded as one type of a hydrolyzable group). However, in the present invention, the two are regarded as being separate.

In the present invention, "the reactive silane group" will be used as the general term representing both of "the isocyanate group" and "the hydrolyzable group".

Preferred as a reactive silane compound is a compound having a plurality of reactive silane groups. The compound (I) is preferably a reactive silane compound as mentioned above. However, more specifically, it is preferably at least one member selected from the group consisting of a compound of the following formula (A) (hereinafter sometimes referred to as compound A), a compound of the following formula (B) (hereinafter sometimes referred to as compound B), and a compound of the following formula (C) (hereinafter sometimes referred to as compound C):

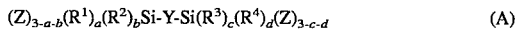

$$(Z)_{3-a-b}(R^1)_a(R^2)_b Si-Y-Si(R^3)_c(R^4)_d(Z)_{3-c-d} \quad (A)$$

wherein each of $R^1$, $R^2$, $R^3$ $R^4$ which are independent of one another, is hydrogen, a hydroxyl group, an amino group or a $C_{1-30}$ organic group, Y is a bivalent organic group, Z is a reactive silane group (i.e. an isocyanate group and/or a hydrolyzable group), each of a and b which are independent of each other, is an integer of 0, 1 or 2, provided $0 \leq a+b \leq 2$, and each of c and d which are independent of each other, is an integer of 0, 1 or 2, provided $0 \leq c+d \leq 2$,

$$(R^5)_e(R^6)_g(R^7)_h Si(Z)_{4-e-g-h} \quad (B)$$

wherein each of $R^5$, $R^6$ and $R^7$ which are independent of one another, is hydrogen, a hydroxyl group, an amino group or a $C_{1-30}$ organic group, provided that at least one of $R^5$, $R^6$ and $R^7$ is an organic group, Z is a reactive silane group (i.e. an isocyanate group and/or a hydrolyzable group), and each of e, g and h which are independent of one another, is an integer of 0, 1 or 2, provided $1 \leq e+g+h \leq 3$,

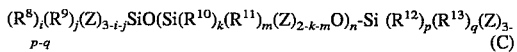

$$(R^8)_i(R^9)_j(Z)_{3-i-j}SiO(Si(R^{10})_k(R^{11})_m(Z)_{2-k-m}O)_n-Si(R^{12})_p(R^{13})_q(Z)_{3-p-q} \quad (C)$$

wherein each of $R^8$ to $R^{13}$ which are independent of one another, is hydrogen, a hydroxyl group, an amino group or a $C_{1-30}$ organic group, provided that at least one of $R^8$ to $R^{13}$ is an organic group, Z is an isocyanate group and/or a hydrolyzable group, each of i and j which are independent of each other, is an integer of 0, 1 or 2, provided $1 \leq i+j \leq 3$, each of k and m which are independent of each other, is an integer of 0, 1 or 2, provided $0 \leq k+m \leq 2$, each of p and q which are independent of each other, is an integer of 0, 1 or 2, provided $1 \leq p+q \leq 3$, provided $i+j+k+m+p+q \leq 7$, and n is an integer of $0 \leq n$ representing the number of repeating units.

The compound (I) is preferably a reactive silane compound having at least one hydrophobic organic group. Particularly, among compounds A, B and C of the above chemical formulas, preferred is a compound wherein at least one organic group is a hydrophobic group to obtain excellent water repellency. In such a case, Z in the reactive silane group may be an isocyanate group or a hydrolyzable group. Both an isocyanate group and a hydrolyzable group may be present in the compound (I).

The isocyanate group or the hydrolyzable group in the compound (I) is a very important constituting unit to improve the adhesion with various substrates.

Now, the compound (I) will be described in further detail.

When the compound (I) is an isocyanate silane compound, this compound (hereinafter sometimes referred to as the compound (I-NCO)) is required to be a compound capable of forming a surface having a contact angle of at least 70° against water. Namely, the contact angle against water of the surface treated with this compound (I-NCO) is required to be at least 70°. The compound (I-NCO) is believed to be chemically or physically bonded to the layer to be treated. Since an isocyanate group is reactive, the compound (I-NCO) is believed to be bonded to the surface of the layer to be treated primarily by a chemical reaction. Namely, in the bonded state, the isocyanate group is believed to be in a modified form. For example, when the layer to be treated is formed by a reactive silane as will be described hereinafter, an isocyanate group is believed to react with a silanol group on the surface of the layer to be treated, or a silanol group formed by detachment of an isocyanate group is considered to react.

It is believed that due to the reactivity of the isocyanate group or due to the effect of the silicon atom directly bonded to the isocyanate group, the compound (I-NCO) exhibits excellent surface properties such as water repellency, abrasion resistance, chemical resistance and weather resistance.

Compounds A and B will form siloxane bonds by the reaction of isocyanate groups (or hydrolyzable groups) among the respective molecules of compounds A and B during the treatment, and therefore the crosslinking degree and the density of the film obtained by the treating agent of the present invention are high, which is believed to be attributable to the high mechanical strength and chemical stability of the film obtainable by the treating agent of the present invention. On the other hand, compound C is a compound having at least two siloxane bonds, and during the treatment, it will form siloxane bonds by the reaction of isocyanate groups (or hydrolyzable groups) to one another among the molecules of compound C, and the crosslinking degree and the density of the film obtained by the treating agent of the present invention will be remarkably high, which is believed to be attributable to the high mechanical strength and chemical stability of the film obtained by the treating agent of the present invention. Further, with compound C, it is conceivable to further increase the density and the crosslinking degree of the film in this connection. Namely, the number of repeating units may be increased (the number for n may be increased) in compound C in the present invention. In such a case, there is no particular limitation to the number for n, and n may be optionally determined depending upon the particular purpose. However, if n is too large, the working efficiency during the treatment tends to be poor, and the practical operation efficiency tends to be low, such being undesirable. The number for n is preferably from 0 to 5. Particularly preferred is a case where n=0.

Further, as described hereinafter, it is possible to further improve such properties by selecting the organic group.

In the present invention, the number of isocyanate groups bonded to one silicon atom is preferably at least two from the viewpoint of the adhesion of the layer to be treated i.e. the layer formed on the substrate surface (hereinafter referred to as a second layer).

Further, in order to increase the adhesion to the underlayer by means of compound C, it is conceivable to increase the number of silicon atoms to which isocyanate groups are directly bonded in compound C. This means that the number of repeating units is increased in compound C in the present invention (i.e. the number for n is increased). The number for n is not particularly limited and may be optionally determined depending upon the particular purpose. However, if n is too large, the working efficiency during the treatment will be poor, and the practical operation efficiency will be poor, such being undesirable. The number for n is preferably from 0 to 5.

Next, when the compound (I) is a hydrolyzable silane compound, this compound (hereinafter sometimes referred to as the compound (I-X)) is required to be a compound capable of forming a surface having a contact angle of at least 70° against water. Namely, the contact angle against water of the surface treated with this compound (I-X) is required to be at least 70°. The compound (I-X) is believed to be chemically or physically bonded to the layer to be treated. Since the hydrolyzable group is reactive, the compound (I-X) is believed to be bonded to the surface of the layer to be treated primarily by a chemical reaction. Namely, in the bonded state, the hydrolyzable group is believed to be in a modified form.

The hydrolyzable group in this compound (I-X) is a group directly bonded to a silicon atom. Such a hydrolyzable group includes, for example, a halogen atom, an alkoxy group, an acyloxy group, an alkoxy-substituted alkoxy group, an aminoxy group, an amide group, an acid amide group and a ketoxymate group. Preferred is a hydrolyzable group bonded to a silicon atom by means of an oxygen atom, such as an alkoxy group, an alkoxy-substituted alkoxy group or an acyl group. The number of carbon atoms of such a hydrolyzable group is preferably at most 8, more preferably at most 4. Most preferred is an alkoxy group having from 1 to 4 carbon atoms.

It is believed that due to the reactivity of this hydrolyzable group or due to the effect of the silicon atom to which the hydrolyzable group is directly bonded, the compound (I-X) exhibits excellent surface properties such as water repellency, abrasion resistance, chemical resistance and weather resistance. As described hereinafter, these properties can further be improved by properly selecting the organic groups. The number of hydrolyzable groups bonded to one silicon atom is preferably at least two in view of the bonding property to the second layer.

The compound (I-X) may be used by itself, but may also be used as a partially hydrolyzed product obtained by hydrolysis. The partially hydrolyzed product of the compound (I-X) is a compound having e.g. a silanol group formed by partially hydrolyzing such a silane compound in water or in an acidic aqueous solution, or a compound obtained by condensation of at least two molecules by the reaction of such silanol groups. As the acid, hydrochloric acid, acetic acid, sulfuric acid, nitric acid, phosphoric acid or sulfonic acid may, for example, be used.

These compounds (I-NCO) and (I-X) are preferably reactive silane compounds A to C of the above described chemical formulas which are capable of forming a surface having a contact angle of at least 70° against water. Such preferable reactive silane compounds A to C (hereinafter sometimes referred to as the compound (I-A), (I-B) and (I-C), respectively), are compounds wherein $R^1$ to $R^{13}$ are organic groups, and at least one of these organic groups is a hydrophobic group, or Y is a hydrophobic group. All of the organic groups may of course be hydrophobic groups. The number of Z groups is preferably at least two per silicon atom. A hydrophobic group is effective for the water repellency, and it is believed that the larger the number of Z groups, the more firmly the bond to the second layer becomes.

Each of $R^1$ to $R^{13}$ which are independent of one another, is hydrogen, a hydroxyl group, an amino group or a $C_{1-30}$ organic group. When each of $R^1$ to $R^{13}$ is an organic group, such an organic group is preferably a hydrocarbon group such as an alkyl group, an alkenyl group, a cycloalkyl group or an aryl group, a halogenated hydrocarbon group such as a chloroalkyl group or a polyfluoroalkyl group, a (halogenated)hydrocarbon group having a hydroxyl group, an epoxy group, an amino group, a mercapto group, a carboxy group or other functional group, or a (halogenated)hydrocarbon group having an ester bond, an ether bond, a thioether bond, an imino bond, an amide bond, a urethane bond or other connecting bond in its carbon chain. Among them, the hydrophobic group may be a long chain hydrocarbon group or a polyfluoroalkyl group as described hereinafter. The long chain hydrocarbon group is preferably an alkyl group or an alkenyl group having from 7 to 20 carbon atoms. As an organic group which is not a hydrophobic group, a lower alkyl group i.e. an alkyl group having from 1 to 4 carbon atoms, is preferred.

More preferred as the compounds (I-A), (I-B) and (I-C) are reactive silane compounds having at least two fluorine atoms. Namely, in the case of the compound (I-A), a compound is preferred wherein Y is a bivalent organic group having at least two fluorine atoms, otherwise at least one of $R^1$ to $R^4$ is a monovalent organic group having at least two fluorine atoms. Of course, both Y and at least one of $R^1$ to $R^4$ may be organic groups having at least two fluorine atoms.

In the case of the compound (I-B), a compound is preferred in which at least one of $R^5$ to $R^7$ is a monovalent organic group having at least two fluorine atoms. In such a case, the organic group having no fluorine atom is preferably the above-mentioned hydrocarbon group which is not a hydrophobic group. Further, the organic group having at least two fluorine atoms is preferably bonded to the silicon atom by means of a carbon atom having no fluorine atom (such as a methylene group).

In the case of the compound (I-C), a compound is preferred in which at least one of $R^8$ to $R^{13}$ is a monovalent organic group having at least two fluorine atoms. In such a case, the organic group having no fluorine atom is preferably the above-mentioned hydrocarbon group which is not a hydrophobic group. Further, the organic group having at least two fluorine atoms is preferably bonded to the silicon atom by means of a carbon atom having no fluorine atom (such as a methylene group).

When Y is a bivalent organic group having at least two fluorine atoms, such a group is preferably a polyfluoroalkylene group, a polyfluorooxalkylene group (the one wherein at least one ether bond is present in the carbon chain of the alkylene group) or a polyfluorothioxalkylene group (the one wherein at least one thioether bond is present in the carbon chain of the alkylene group). Particularly preferred is a bivalent organic group wherein the portions bonded to silicon atoms at both ends are polymethylene chains (particularly dimethylene groups) and the intermediate portion is a perfluoroalkylene group or a perfluorooxalkylene group. The number of carbon atoms of such Y is a preferably from 6 to 30, particularly from 6 to 16.

When Y is not a bivalent organic group having at least two fluorine atoms, such a group is preferably an alkylene group, an oxalkylene group or a thioxalkylene group. Its carbon number is preferably from 2 to 30, particularly from 2 to 12. In the case of the compound (I-A) wherein only Y is a hydrophobic group and Y has no fluorine atom, the carbon number of such Y is preferably at least 7.

When any one of $R^1$ to $R^{13}$ is a monovalent organic group having at least two fluorine atoms, such a group is preferably a polyfluoroalkyl group, a polyfluorooxalkyl group or a polyfluorothioxalkyl group, or an organic group wherein any one of such groups and a hydrocarbon group such as an alkylene group are bonded by an ester bond or other connecting bond as described above (which organic group is bonded to a silicon atom at the other terminal of the hydrocarbon group). The polyfluoroalkyl group or the polyfluorooxalkyl group is preferably the one wherein the terminal portions bonded to silicon atoms or the vicinities thereof are alkylene groups (particularly dimethylene groups) and other portion is a perfluoroalkylene group.

The perfluoro moiety of a monovalent organic group is preferably a perfluoroalkyl group, a perfluorooxalkyl group or a perfluorothioxalkyl group having at least 3 carbon atoms, particularly a perfluoroalkyl group having from 3 to 16 carbon atoms.

More specifically, particularly preferred is a polyfluoroalkyl group having a perfluoroalkyl moiety, of the formula $C_nF_{2n+1}C_mH_{2m}-$ wherein n is an integer of from 3 to 12, and m is an integer of from 2 to 4, or a perfluoroalkyl group of the formula $C_nF_{2n+1}-$ wherein n is an integer of from 3 to 16.

Specific examples of the compounds (I-A), (I-B) and (I-C) will be shown below. However, the compounds (I-A), (I-B) and (I-C) are not restricted to such specific examples. In the following chemical formulas, each of n and m is an integer of at least 1, R is an alkyl group, etc., $R_f$ is a polyfluoroalkyl group, and $R_F$ is a perfluoroalkyl group. In these chemical formulas, R preferably has from 1 to 12 carbon atoms, and $R_f$ is preferably an ethyl group having a perfluoroalkyl group at its terminal. Z is an isocyanate group and/or a hydrolyzable group.

(A-1):
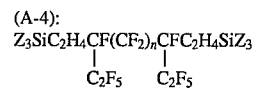

(A-2):
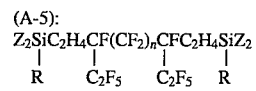

(A-3):
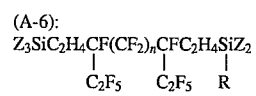

(A-4):
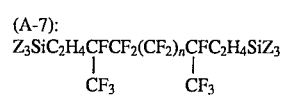

(A-5):
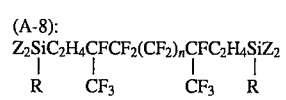

(A-6):
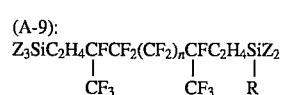

(A-7):
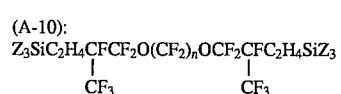

(A-8):
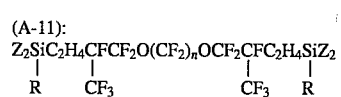

(A-9):
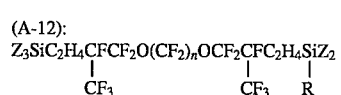

(A-10):
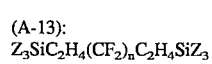

(A-11):
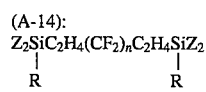

(A-12):
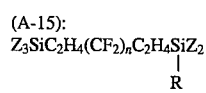

(A-13):
$Z_3SiC_2H_4(CF_2)_nC_2H_4SiZ_3$ (A-14):
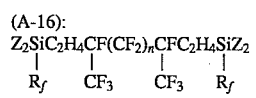

(A-15):
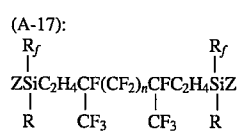

(A-16):
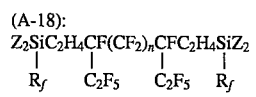

(A-17):
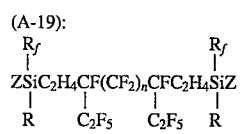

(A-18):
$Z_2SiC_2H_4CF(CF_2)_nCFC_2H_4SiZ_2$
   |            |         |        |
   $R_f$       $C_2F_5$  $C_2F_5$  $R_f$ (A-19):
$ZSiC_2H_4CF(CF_2)_nCFC_2H_4SiZ$
 |  |            |        |      |
 $R_f$ $R$   $C_2F_5$  $C_2F_5$ $R$  $R_f$

-continued (A-20):
$$Z_2SiC_2H_4CFCF_2(CF_2)_nCFC_2H_4SiZ_2$$
with $R_f$ on each Si-adjacent CF and $CF_3$ on each middle CF (A-21):
$$ZSiC_2H_4CFCF_2(CF_2)_nCFC_2H_4SiZ$$
with $R_f$ above each Si and $R$ below each Si; $CF_3$ on middle carbons (A-22):
$$Z_2SiC_2H_4CFCF_2O(CF_2)_nOCF_2CFC_2H_4SiZ_2$$
with $R_f$ above, $CF_3$ below (A-23):
$$ZSiC_2H_4CFCF_2O(CF_2)_nOCF_2CFC_2H_4SiZ$$
with $R_f$/$R$ on Si, $CF_3$ on CF (A-24):
$$Z_2SiC_2H_4(CF_2)_nC_2H_4SiZ_2$$
with $R_f$ on each Si (A-25):
$$ZSiC_2H_4(CF_2)_nC_2H_4SiZ$$
with $R_f$ above, $R$ below each Si (A-26):
$$Z_2SiC_2H_4CF(CF_2)_nCFC_2H_4SiZ_3$$
with $R_f$ on first Si, $CF_3$ on CFs (A-27):
$$Z_2SiC_2H_4CF(CF_2)_nCFC_2H_4SiZ_2$$
with $R$/$CF_3$/$CF_3$/$R$ (A-28):
$$Z_3SiC_2H_4CF(CF_2)_nCFC_2H_4SiZ_2$$
with $C_2F_5$/$C_2F_5$/$R_f$ (A-29):
$$Z_2SiC_2H_4CF(CF_2)_nCFC_2H_4SiZ$$
with $R_f$ top right; $R$/$C_2F_5$/$C_2F_5$/$R$ (A-30):
$$Z_3SiC_2H_4CFCF_2(CF_2)_nCFC_2H_4SiZ_2$$
with $R_f$ top; $CF_3$/$CF_3$ below (A-31):
$$Z_2SiC_2H_4CFCF_2(CF_2)_nCFC_2H_4SiZ$$
with $R_f$ top; $R$/$CF_3$/$CF_3$/$R$ (A-32):
$$Z_3SiC_2H_4CFCF_2O(CF_2)_nOCF_2CFC_2H_4SiZ_2$$
with $R_f$ top; $CF_3$/$CF_3$ (A-33):
$$Z_2SiC_2H_4CFCF_2O(CF_2)_nOCF_2CFC_2H_4SiZ$$
with $R_f$ top right; $R$/$CF_3$/$CF_3$/$R$ (A-34):
$$Z_3SiC_2H_4(CF_2)_nC_2H_4SiZ_2$$
with $R_f$ on right Si (A-35):
$$Z_2SiC_2H_4(CF_2)_nC_2H_4SiZ$$
with $R_f$ top right; $R$/$R$ (A-36):
$$ZSiC_2H_4CF(CF_2)_nCFC_2H_4SiZ_3$$
with $R_f$ top; $R$/$CF_3$/$CF_3$ (A-37):
$$Z_2SiC_2H_4CF(CF_2)_nCFC_2H_4SiZ_2$$
with $R_f$ top right; $R$/$CF_3$/$CF_3$ (A-38):
$$Z_3SiC_2H_4CF(CF_2)_nCFC_2H_4SiZ$$
with $R$ top right; $C_2F_5$/$C_2F_5$/$R_f$ (A-39):
$$Z_2SiC_2H_4CF(CF_2)_nCFC_2H_4SiZ_2$$
with $R_f$ top right; $R$/$C_2F_5$/$C_2F_5$ (A-40):
$$Z_3SiC_2H_4CFCF_2(CF_2)_nCFC_2H_4SiZ$$
with $R_f$ top right; $CF_3$/$CF_3$/$R$ (A-41):
$$Z_2SiC_2H_4CFCF_2(CF_2)_nCFC_2H_4SiZ_2$$
with $R_f$ top right; $R$/$CF_3$/$CF_3$ (A-42):
$$Z_3SiC_2H_4CFCF_2O(CF_2)_nOCF_2CFC_2H_4SiZ$$
with $R_f$ top right; $CF_3$/$CF_3$/$R$ (A-43):
$$Z_2SiC_2H_4CFCF_2O(CF_2)_nOCF_2CFC_2H_4SiZ_2$$
with $R_f$ top right; $R$/$CF_3$/$CF_3$ (A-44):
$$Z_3SiC_2H_4(CF_2)_nC_2H_4SiZ$$
with $R_f$ top right; $R$ (A-45):
$$Z_2SiC_2H_4(CF_2)_nC_2H_4SiZ_2$$
with $R_f$ top right; $R$ -continued (A-46):
$Z_2SiC_2H_4SiZ_2$
      |      |
      $R_f$  $R_f$ (A-47):
$Z_2SiC_2H_4SiZ_3$
      |
      $R_f$ (A-48):
      R
      |
$ZSiC_2H_4SiZ_3$
      |
      $R_f$ (A-49):
      R    R
      |    |
$ZSiC_2H_4SiZ_2$
      |
      $R_f$ (A-50):
           R
           |
$Z_2SiC_2H_4SiZ_2$
           |
           $R_f$ (A-51):
      $R_f$   $R_f$
      |       |
$ZSiC_2H_4SiZ$
      |       |
      R       R (A-52):
      $R_f$   $R_f$
      |       |
$ZSiC_2H_4SiZ_2$
      |
      R (A-53):
$Z_2SiC_2H_4OC_2H_4SiZ_2$
      |             |
      $R_f$         $R_f$ (A-54):
$Z_2SiC_2H_4OC_2H_4SiZ_3$
      |
      $R_f$ (A-55):
      R
      |
$ZSiC_2H_4OC_2H_4SiZ_3$
      |
      $R_f$ (A-56):
      R             R
      |             |
$ZSiC_2H_4OC_2H_4SiZ_2$
      |
      $R_f$ (A-57):
                    R
                    |
$Z_2SiC_2H_4OC_2H_4SiZ_2$
                    |
                    $R_f$ (A-58):
      $R_f$         $R_f$
      |             |
$ZSiC_2H_4OC_2H_4SiZ$
      |             |
      R             R (A-59):
      $R_f$         $R_f$
      |             |
$ZSiC_2H_4OC_2H_4SiZ_2$
      |
      R (A-60):
$Z_2SiC_2H_4SC_2H_4SiZ_2$
      |             |
      $R_f$         $R_f$ (A-61):
$Z_2SiC_2H_4SC_2H_4SiZ_3$
             |
             $R_f$ (A-62):
      R
      |
$ZSiC_2H_4SC_2H_4SiZ_3$
      |
      $R_f$ (A-63):
      R             R
      |             |
$ZSiC_2H_4SC_2H_4SiZ_2$
      |
      $R_f$ (A-64):
                    R
                    |
$Z_2SiC_2H_4SC_2H_4SiZ_2$
                    |
                    $R_f$ (A-65):
      $R_f$         $R_f$
      |             |
$ZSiC_2H_4SC_2H_4SiZ$
      |             |
      R             R (A-66):
      $R_f$         $R_f$
      |             |
$ZSiC_2H_4SC_2H_4SiZ_2$
      |
      R (A-67):
$Z_2SiC_2H_4OC_2H_4OC_2H_4SiZ_2$
      |                   |
      $R_f$               $R_f$ (A-68):
$Z_2SiC_2H_4OC_2H_4OC_2H_4SiZ_3$
             |
             $R_f$ (A-69):
      R
      |
$ZSiC_2H_4OC_2H_4OC_2H_4SiZ_3$
      |
      $R_f$ (A-70):
      R                   R
      |                   |
$ZSiC_2H_4OC_2H_4OC_2H_4SiZ_2$
      |
      $R_f$ (A-71):
                          R
                          |
$Z_2SiC_2H_4OC_2H_4OC_2H_4SiZ_2$
                          |
                          $R_f$ (A-72):
      $R_f$               $R_f$
      |                   |
$ZSiC_2H_4OC_2H_4OC_2H_4SiZ$
      |                   |
      R                   R -continued (A-73):
ZSiC₂H₄OC₂H₄OC₂H₄SiZ₂ with R_f substituents and R (A-74):
Z₂SiC₂H₄SC₂H₄SC₂H₄SiZ₂ with R_f substituents (A-75):
Z₂SiC₂H₄SC₂H₄SC₂H₄SiZ₃ with R_f (A-76):
ZSiC₂H₄SC₂H₄SC₂H₄SiZ₃ with R and R_f (A-77):
ZSiC₂H₄SC₂H₄SC₂H₄SiZ₂ with R, R_f, R (A-78):
Z₂SiC₂H₄SC₂H₄SC₂H₄SiZ₂ with R and R_f (A-79):
ZSiC₂H₄SC₂H₄SC₂H₄SiZ with R_f and R (A-80):
ZSiC₂H₄SC₂H₄SC₂H₄SiZ₂ with R_f and R (B-1):
$R_F C_2H_4 SiZ_3$ (B-2):
$R_F C_2H_4 SiZ_2 R$ (B-3):
$(R_F C_2H_4)_2 SiZ_2$ (B-4):
$(R_F C_2H_4)_3 SiZ$ (B-5):
$R_F CONH C_3H_6 SiZ_3$ (B-6):
$R_F CONH C_3H_6 SiZ_2 R$ (B-7):
$R_F CONH C_2H_4 NH C_3H_6 SiZ_3$ (B-8):
$R_F CONH C_2H_4 NH C_3H_6 SiZ_2 R$ (B-9):
$R_F CON(CH_3) C_2H_4 CONH(CH_3) SiZ_3$ (B-10):
$R_F CON(CH_3) C_2H_4 CONH(CH_3) SiZ_2 R$ (B-11):
$R_F C_2H_4 OCO(CH_2)_2 S(CH_2)_3 SiZ_3$ (B-12):
$R_F C_2H_4 OCO(CH_2)_2 S(CH_2)_3 SiZ_2 R$ (B-13):
$R_F C_2H_4 OCONH(CH_2)_3 SiZ_3$ (B-14):
$R_F C_2H_4 OCONH(CH_2)_3 SiZ_2 R$ (B-15):
$R_F C_2H_4 NH(CH_2)_2 SiZ_3$ (B-16):
$R_F C_2H_4 NH(CH_2)_2 SiZ_2 R$ (B-17):
$CF_3 C_2F_4 O(CFCF_2O)_m CFCONH(CH_2)_3 SiZ_3$ with $CF_3$, $CF_3$ (B-18):
$CF_3 C_2F_4 O(CFCF_2O)_m CFCONH(CH_2)_3 SiZ_2$ with $CF_3$, $CF_3$, R (C-1):
$Z_2 SiO-(SiO)_n-SiZ_3$ with R, Z, Z (C-2):
$Z_2 SiO-(SiO)_n-SiZ_3$ with R, Z, R (C-3):
$Z_2 SiO-(SiO)_n-SiZ_3$ with R_f, Z, R (C-4):
$Z_2 SiO-(SiO)_n-SiZ_3$ with R, R, R (C-5):
$Z_2 SiO-(SiO)_n-SiZ_3$ with R_f, R_f, R (C-6):
$Z_2 SiO-(SiO)_n-SiZ_3$ with R_f, R, R -continued
(C-7):
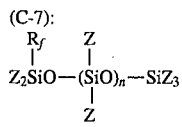
(C-8):
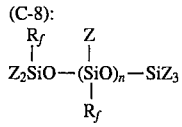
(C-9):
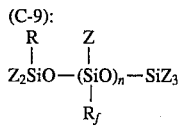
(C-10):
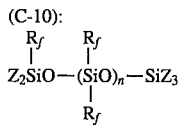
(C-11):
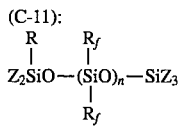
(C-12):
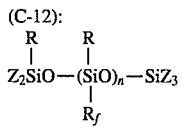
(C-13):
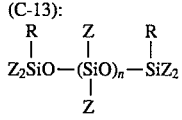
(C-14):
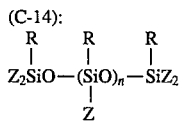
(C-15):
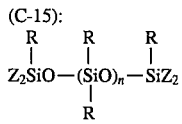
(C-16):
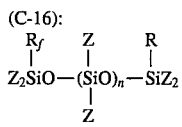
(C-17):
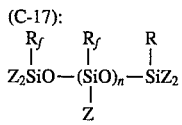
(C-18):
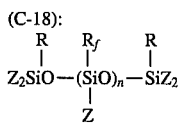
(C-19):
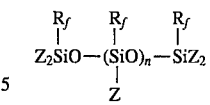
(C-20):
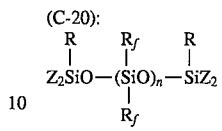
(C-21):
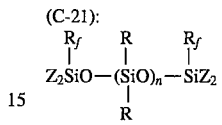
(C-22):
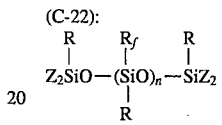
(C-23):
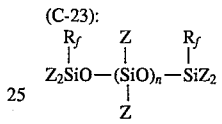
(C-24):
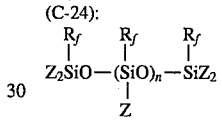
(C-25):
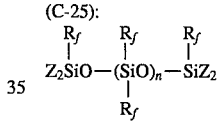
(C-26):
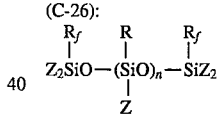
(C-27):
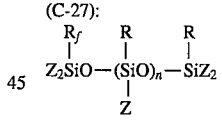
(C-28):
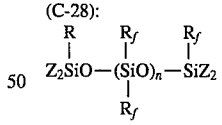
(C-29):
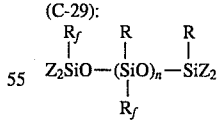
(C-30):
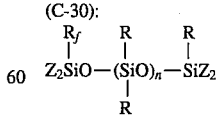
(C-31):
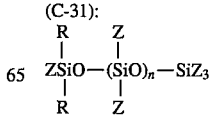

-continued
(C-32): 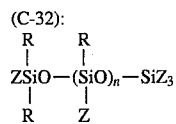
(C-33): 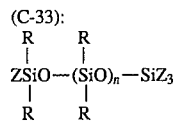
(C-34): 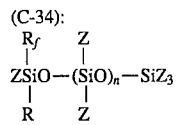
(C-35): 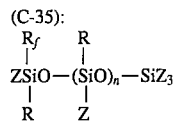
(C-36): 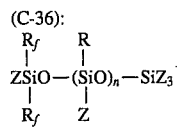
(C-37): 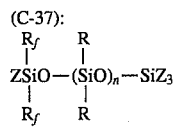
(C-38): 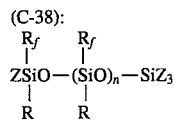
(C-39): 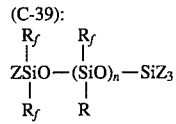
(C-40): 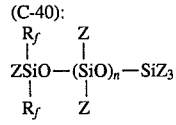
(C-41): 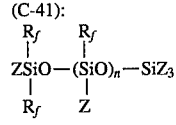
(C-42): 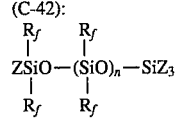
(C-43): 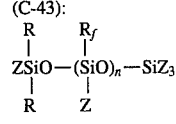
(C-44):
-continued
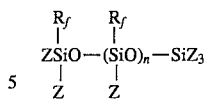
(C-45): 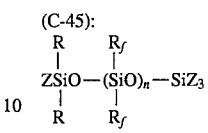
(C-46): 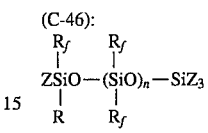
(C-47): 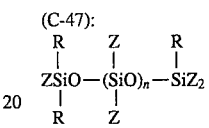
(C-48): 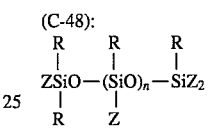
(C-49): 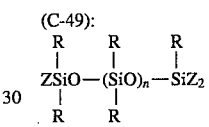
(C-50): 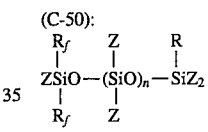
(C-51): 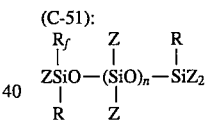
(C-52): 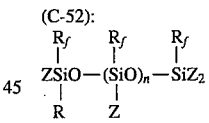
(C-53): 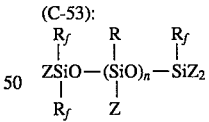
(C-54): 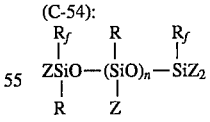
(C-55): 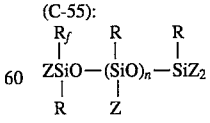
(C-56): 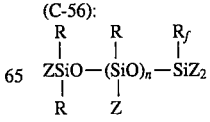

-continued
(C-57):
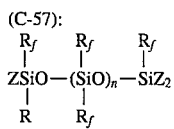
(C-58):
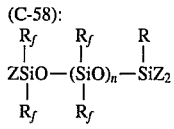
(C-59):
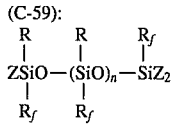
(C-60):
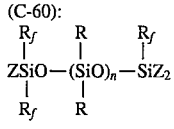
(C-61):
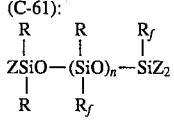
(C-62):
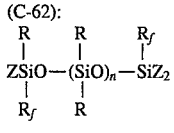
(C-63):
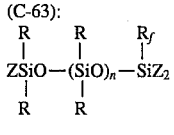
(C-64):
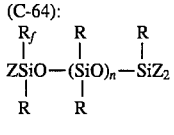
(C-65):
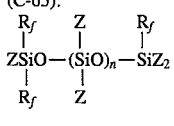
(C-66):
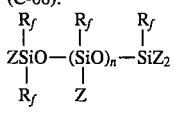
(C-67):
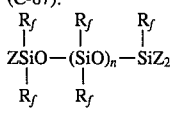
(C-68):
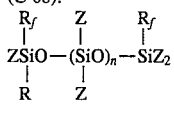
(C-69):
-continued
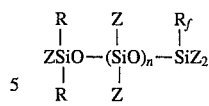
(C-70):
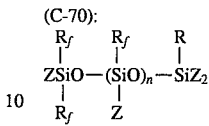
(C-71):
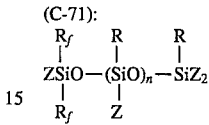
(C-72):
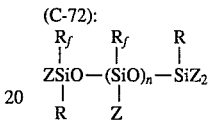
(C-73):
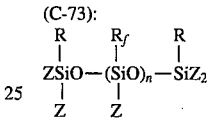
(C-74):
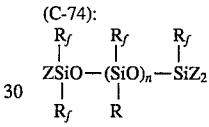
(C-75):
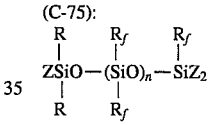
(C-76):
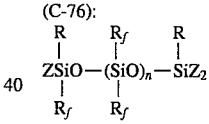
(C-77):
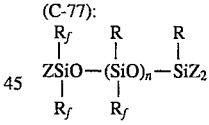
(C-78):
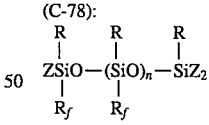
(C-79):
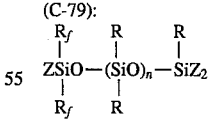
(C-80):
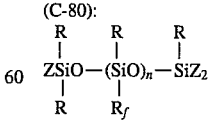
(C-81):
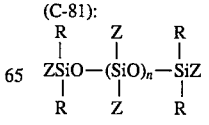

-continued
(C-82): 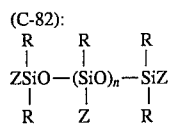
(C-83): 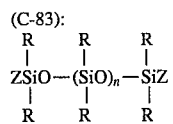
(C-84): 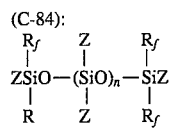
(C-85): 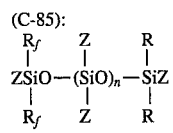
(C-86): 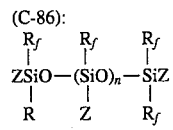
(C-87): 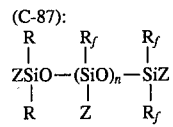
(C-88): 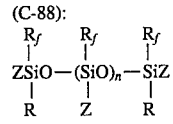
(C-89): 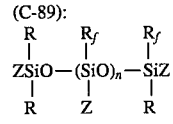
(C-90): 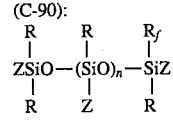
(C-91): 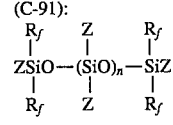
(C-92): 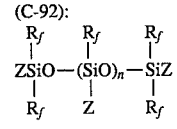
(C-93): 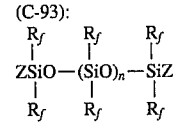
(C-94): 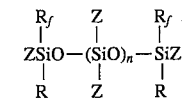
(C-95): 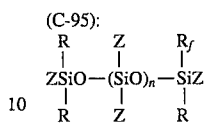
(C-96): 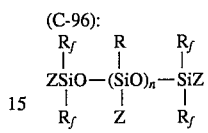
(C-97): 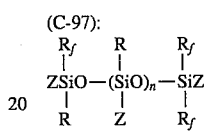
(C-98): 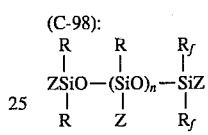
(C-99): 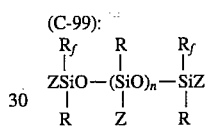
(C-100): 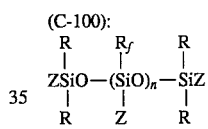
(C-101):
$$CH_3$$
$$(OCN)_3SiOSi(NCO)_2$$
(C-102):
$$(CH_3)_2CF_3$$
$$(OCN)_3SiOSi(NCO)_2$$
(C-103):
$$C_8H_{17}$$
$$(OCN)_3SiOSi(NCO)_2$$
(C-104):
$$(CH_2)_2C_4F_9$$
$$(OCN)_3SiOSi(NCO)_2$$
(C-105):
$$C_{18}H_{37}$$
$$(OCN)_3SiOSi(NCO)_2$$
(C-106):
$$(CH_2)_2C_8F_{17}$$
$$(OCN)_3SiOSi(NCO)_2$$
(C-107):
$$Ph$$
$$(OCN)_3SiOSi(NCO)_2$$
(C-108):
$$C_8F_{17}CONH(CH_2)_3$$
$$(OCN)_3SiOSi(NCO)_2$$

-continued (C-109):
C$_8$F$_{17}$CONHC$_2$H$_4$NH(CH$_2$)$_3$
  |
  (OCN)$_3$SiOSi(NCO)$_2$ (C-110):
C$_8$F$_{17}$C$_2$H$_4$OCOC$_2$H$_4$S(CH$_2$)$_3$
  |
  (OCN)$_3$SiOSi(NCO)$_2$ (C-111):
C$_8$F$_{17}$C$_2$H$_4$OCONH(CH$_2$)$_3$
  |
  (OCN)$_3$SiOSi(NCO)$_2$ (C-112):
         (CH$_2$)$_2$C$_8$F$_{17}$
         |
(OCN)$_3$SiOSi(NCO)
         |
         Cl (C-113):
         (CH$_2$)$_2$C$_8$F$_{17}$
         |
(OCN)$_2$SiOSi(NCO)$_2$
         |
         (CH$_2$)$_2$C$_8$F$_{17}$ (C-114):
         (CH$_2$)$_2$C$_8$F$_{17}$
         |
(OCN)$_2$SiOSi(NCO)$_2$
         |
         CH$_3$ (C-115):
     Cl    (CH$_2$)$_2$C$_8$F$_{17}$
     |     |
(OCN)SiO—Si(NCO)$_2$
     |
     (CH$_2$)$_2$C$_8$F$_{17}$ (C-116):
     (CH$_2$)$_2$C$_8$F$_{17}$   (CH$_2$)$_2$C$_8$F$_{17}$
     |                           |
(OCN)SiO————————Si(NCO)
     |                           |
     Cl                          Cl (C-117):
         C$_{18}$H$_{37}$
         |
(OCN)$_2$SiOSi(NCO)$_2$
         |
         CH$_3$ (C-118):
         (CH$_2$)$_2$C$_8$F$_{17}$
         |
(OCN)$_2$SiOSi(NCO)$_2$
         |
         (CH$_2$)$_2$C$_4$F$_9$ (C-119):
         (CH$_2$)$_2$C$_8$F$_{17}$
         |
(OCN)SiOSi(NCO)$_3$
         |
         CH$_3$ (C-120):
         C$_8$H$_{17}$
         |
(OCN)SiOSi(NCO)$_3$
         |
         CH$_3$ (C-121):
         (CH$_2$)$_2$C$_8$F$_{17}$
         |
(OCN)SiOSi(NCO)$_3$
         |
         (CH$_2$)$_2$C$_8$F$_{17}$ (C-122):
         C$_8$H$_{17}$
         |
(OCN)SiOSi(NCO)$_3$
         |
         C$_8$H$_{17}$ (C-123):
     (CH$_2$)$_2$C$_9$F$_{17}$   (CH$_2$)$_2$C$_9$F$_{19}$
     |                           |
(OCN)SiO————————Si(NCO)$_2$
     |
     (CH$_2$)$_2$C$_8$F$_{17}$ (C-124):
     C$_2$H$_4$C$_8$F$_{17}$   CH$_3$
     |                         |
(OCN)SiO————————Si(NCO)$_2$
     |
     CH$_3$ (C-125):
     C$_8$F$_{17}$(CH$_2$)$_2$C$_8$F$_{17}$   (CH$_2$)$_2$C$_9$F$_{19}$
     |                                         |
(OCN)SiO————————————Si(NCO)
     |                                         |
     (CH$_2$)$_2$C$_8$F$_{17}$                 (CH$_2$)$_2$C$_9$F$_{19}$ (C-126):
     CH$_3$    CH$_3$
     |         |
(OCN)SiO—Si(NCO)
     |         |
     CH$_3$    CH$_3$ (C-127): 
         (CH$_2$)$_2$C$_8$F$_{17}$   CH$_3$
         |                           |
(OCN)SiO————————Si(NCO)
         |                           |
         (CH$_2$)$_2$C$_8$F$_{17}$   CH$_3$ (C-128):
     CH$_3$    C$_8$H$_{17}$
     |         |
(OCN)SiO—Si(NCO)
     |         |
     CH$_3$    C$_8$H$_{17}$ (C-129):
     (CH$_2$)$_2$C$_8$F$_{17}$   NCO
     |                           |
(OCN)$_2$SiO————(SiO)$_n$—Si(NCO)$_3$
                                 |
                                 NCO (C-130):
     (CH$_2$)$_2$C$_8$F$_{17}$   Cl
     |                           |
(OCN)$_2$SiO————(SiO)$_n$—Si(NCO)$_3$
                                 |
                                 NCO (C-131):
     (CH$_2$)$_2$C$_8$F$_{17}$   CH$_3$
     |                           |
(OCN)$_2$SiO————(SiO)$_n$—Si(NCO)$_3$
                                 |
                                 NCO (C-132):
     (CH$_2$)$_2$C$_8$F$_{17}$   (CH$_2$)$_2$C$_8$F$_{17}$
     |                           |
(OCN)$_2$SiO————(SiO)$_n$—Si(NCO)$_3$
                                 |
                                 NCO (C-133):
     (CH$_2$)$_2$C$_8$F$_{17}$   CH$_3$
     |                           |
(OCN)$_2$SiO————(SiO)$_n$—Si(NCO)$_3$
                                 |
                                 CH$_3$ (C-134):
     C$_8$F$_{17}$(CH$_2$)$_2$C$_8$F$_{17}$   NCO    (CH$_2$)$_2$C$_8$F$_{17}$
     |                                         |      |
(OCN)$_2$SiO————————(SiO)$_n$—Si(NCO)$_2$
                                               |
                                               NCO

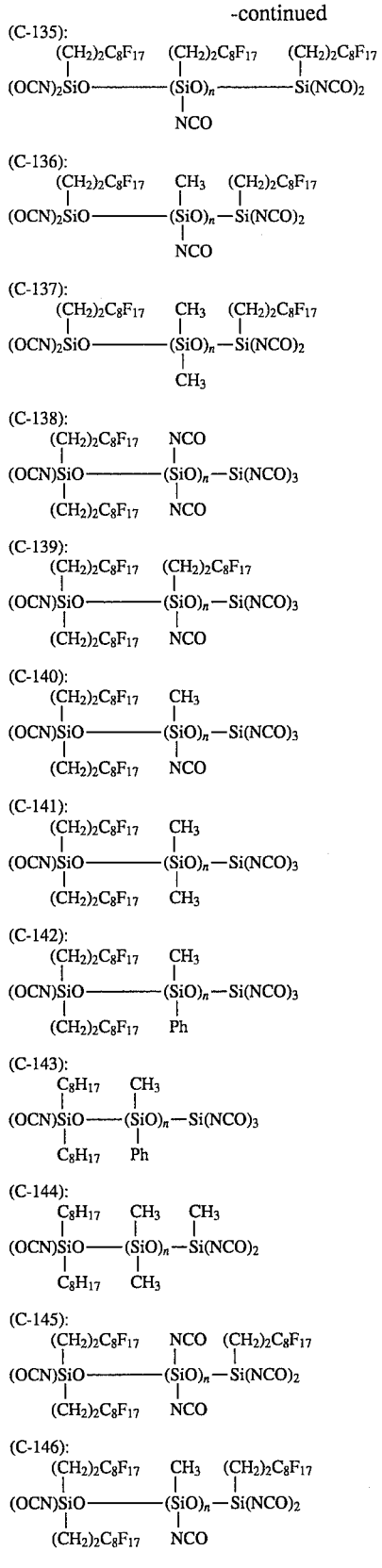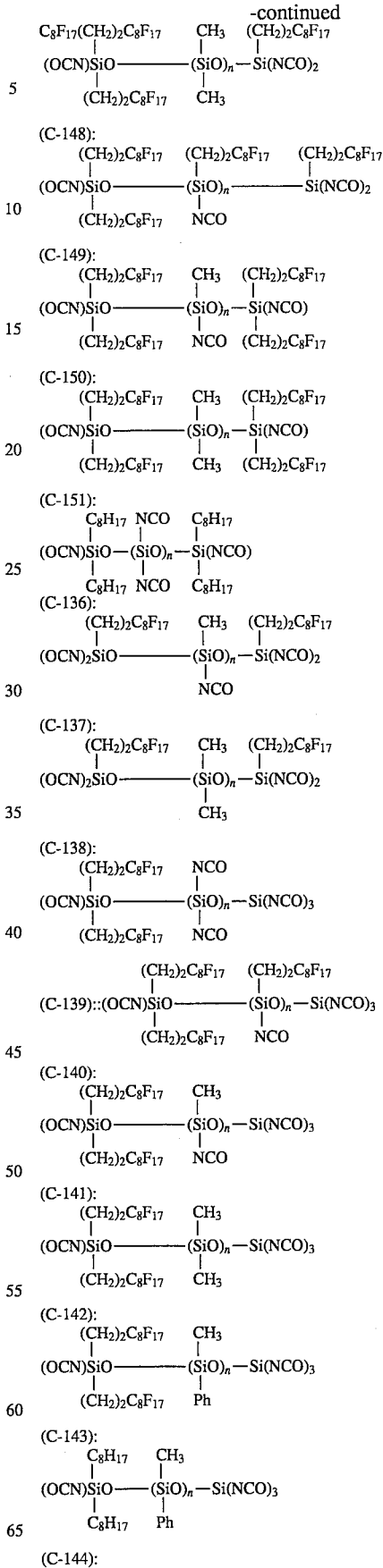

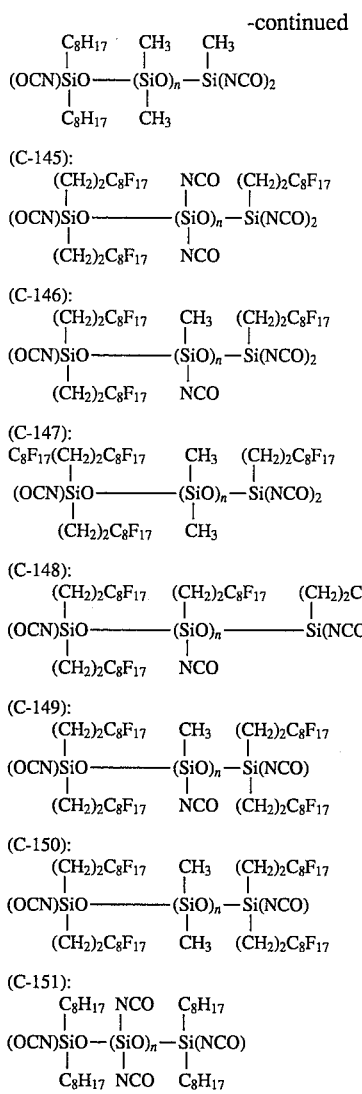

To the treating agent for forming the first layer in the present invention, other compounds or additives may be added depending upon the particular purpose. The additives, etc. may suitably be selected taking the reactivity and compatibility with other components into consideration. For example, it is possible to incorporate super fine particles of various metals or metal oxides such as silica, alumina, zirconia or titania, or various resins. Further, a dye or pigment may also be added if tinting is required. The amount of additives is usually at a level of from 0.01 to 20% by weight based on the total amount of the compounds (I), and an excessive addition is not advisable, since such will reduce the water repellency or abrasion resistance of the present invention.

Further, if electrical conductivity is required, it is possible to add a material to provide an optional resistivity (such as tin oxide, ITO or zinc oxide). The amount of such an additive may suitably be determined depending upon the particular purpose.

The above composition may directly be coated on the second layer as the coating object by a manual application method. Otherwise, it may be used in the form of a solution prepared by dissolving or diluting it with an organic solvent. The total amount of the compounds (I) contained in the solution by means of such an organic solvent is determined taking into consideration the formability of the coating film (operation efficiency), the stability, the thickness of the coating film and the economical aspect, and it is usually within a range of from 0.1 to 30% by weight.

As the organic solvent, various organic solvents such as acetic acid esters, aromatic hydrocarbons, halogenated hydrocarbons, ketones, ethers or alcohols, may be employed. However, when the compound A or B has an isocyanate group, a solvent having a reactive functional group (such as a hydroxyl group) is undesirable. Therefore, with respect to the compound (I-NCO), alcohols are not desirable, but with respect to the compound (I-X), there is no particular restriction. The diluting solvent may not be limited to one type, and two or more solvents may be used in combination as a mixture.

The compounds A to C are substances having low surface free energy. A compound very limitedly present in a free state in the coating film moves on the extreme surface layer to reduce the frictional resistance on the surface, which is considered to be one of the factors for excellent abrasion resistance.

For the treatment of the surface of the second layer, no special pretreatment is required. A coating film may be formed by applying the liquid containing the composition thus prepared, on the surface by a usual method, such as brush coating, casting, spin coating, dip coating or spray coating, followed by drying in air or in a nitrogen stream.

Excellent properties can be obtained simply by drying in air. However, for the purpose of increasing the drying rate, heating may be employed without any problem. The heating temperature is preferably at a level of from 50° to 250° C., and the heating time is usually from 5 to 60 minutes. If the heating is required, the heating temperature and time may be determined taking into consideration the heat resistance of the substrate.

The thickness of the first layer formed by this surface treatment is not particularly limited. However, it is preferred to be very thin. A preferred film thickness is at most 2 μm. The lower limit is a single molecular layer thickness.

Now, the treating agent containing the compound (II) for forming a thin film of a heat resistant polymer and fine particles of a polymer, and the second layer formed by treatment therewith, will be described.

In the present invention, as the materials for forming the second layer, the compound (II) capable of forming a thin film of a heat resistant polymer and fine particles of a polymer are used. The second layer constituting an underlayer of the first layer serves to improve the durability of the first layer remarkably, and it also has an effect of improving the adhesion to the substrate. This second layer is usually formed on the substrate surface. However, there is no particular problem even when the substrate surface already has a vapor-deposited film, a sputtered film or various films formed by e.g. a wet system.

As such various films, an electrostatic film, a transparent electrically conductive film, an electromagnetic wave shielding film, an ultraviolet absorbing film, a heat ray absorbing film and a heat ray reflecting film may, for example, be mentioned, and such films may be used in a proper combination. The materials for various films are not particularly limited, and films containing metal oxides of e.g. Si, Zr, Ti, Zn, Al, Sn, Sb, Pb and Ta, may, for example, be mentioned.

The compound (II) capable of forming a thin film of a heat resistant polymer and the fine particles of a polymer to form the second layer, are not particularly limited and may suitably be selected depending upon the particular purpose.

Polymer compounds made of various commercially available materials may be used.

The fine particles of a polymer may, for example, be fine particles of a polyethylene resin, a polypropylene resin, a polystyrene resin, a polyacrylate resin, a polymethyl methacrylate resin, a polyvinyl chloride resin, a polyvinyl alcohol resin, a polycarbonate resin, a polyacetal resin, a polyester resin, a polyamide resin, a polyimide resin, a fluorine resin, a phenol resin, an epoxy resin and a silicone resin. As the material for the fine particles of a polymer, at least one member selected from such exemplified compounds, may be employed.

Among the above-mentioned materials for the fine particles of a polymer, a thermoplastic resin such as a polystyrene resin or a polymethyl methacrylate resin, is particularly preferred.

Further, when it is desired to provide roughness only on the surface, it is advisable to employ fine polymer particles having a low surface free energy. In such a case, a fluorine resin such as PFA or PTFE is preferred as the material for the fine particles of a polymer.

The average particle size of the fine particles of a polymer is not particularly limited, but is preferably within a range of from 1 nm to 1,000 nm from the viewpoint of the film strength. Particularly when the transparency is of importance, the average particle size is preferably at most 500 nm, more preferably at most 200 nm, for the purpose of preventing scattering of light rays. The particle size of the fine particles of a polymer is one of the factors for controlling the degree of the surface roughness to be formed. Namely, the larger the particle size of the fine particles of a polymer, the larger the surface roughness. Namely, it becomes possible to embed a larger amount of the upper layer material. However, if the degree of the roughness is too much, the embedding effect tends to be low, and the protection from abrasion tends to be difficult, whereby the abrasion resistance will be low.

The molecular weight of the fine particles of a polymer is not particularly limited so long as the above particle size is satisfied, but the molecular weight is preferably from 10,000 to 1,000,000. If the molecular weight is too small, the fine particles are likely to show interaction with the solvent and become susceptible to the influence such as dissolution or swelling, whereby it tends to be difficult to maintain the form of fine particles of a polymer. On the other hand, if the molecular weight is too large, it will be difficult to form fine particles.

Further, it is possible to control the degree of the depth of the roughness by adjusting the particle size of the fine particles of a polymer and the film thickness. For example, it is possible to form deep roughness by increasing the film thickness or the particle size of the fine particles of a polymer. Inversely, it is possible to form shallow roughness by reducing the film thickness or by using a reduced size of fine particles of a polymer in a thick film.

The depth of roughness is preferably within a range of from 1 nm to 1,000 nm, more preferably from 10 nm to 50 nm, from the viewpoint of the film strength.

On the other hand, the density of roughness can be controlled by the shape of the fine particles of a polymer, the amount of incorporation, etc.

The shape of the fine particles of a polymer is not particularly limited, but is preferably spherical. Namely, in the case of needle-like particles with a large aspect ratio, their presence in the vicinity of the film surface tends to be random, and the contour of the resulting roughness tends to be non-uniform, whereby there will be a problem that the surface properties of the film are not constant. Whereas, in the case of spherical particles, their presence in the vicinity of the surface will be uniform, and uniform roughness will be formed at the film surface, whereby the surface properties of the film can be made constant.

Further, as compared with particles with a large aspect ratio, spherical particles are advantageous also from the viewpoint of the density of roughness. Accordingly, by using spherical particles, it is possible to obtain a film having a larger surface area. The larger surface area means an increase of reactive sites (functional groups) which are reactive with the upper layer material, whereby high densification of the upper layer material can be accomplished, and the durability can be increased.

Further, even if the surface area of the underlayer is increased to increase the reactive sites, with a conventional material, it has been difficult to react it effectively (i.e. at a high probability) with the reactive sites. Whereas, the compound (I) of the present invention has a high reactivity and is capable of completely reacting with the increased reactive sites, whereby high densification of the upper layer material can certainly be realized, and it is possible to attain the high water repellency, chemical resistance, weather resistance and abrasion resistance of the present invention.

Further, the shape of roughness serves to reduce the contact area with an abrading object, and the roughness of the present invention has a high degree of hardness, whereby the material embedded in the roughness will be protected from abrasion, which is believed to be attributable to the remarkably high abrasion resistance accomplished by the present invention.

The proportion of the fine particles of a polymer to the total amount of the compound (II) and the fine particles of a polymer, is not particularly limited. Basically, the amount of the fine particles of a polymer should be determined depending upon the particular purpose. However, when it is desired to reduce the density of the roughness, the amount may be small. Inversely, when the density of the roughness is desired to be increased, the amount may be large. To control the amount of the fine particles of a polymer also means to control the amount of the material of the first layer as its upper layer.

If the amount of the fine particles of a polymer is too large, the mechanical strength of the coating film formed after the heat decomposition tends to be low. Therefore, the amount is preferably at most 80 wt %. On the other hand, if the amount is too low, the effect of the addition of the fine particles of a polymer will hardly be obtained. The amount is at least 5 wt %. Preferably, the amount is from 5 to 50 wt %.

As mentioned above, the density of roughness can be controlled by the amount and the shape of the fine particles of a polymer. The density of roughness to be formed is preferably such that the average distance between the centers of concaves or valleys is at most 10 μm, particularly preferably at most 1 μm.

The shape of the resulting roughness can be controlled by the film-forming method, the film thickness, the shape and diameter of the fine particles of a polymer, etc., and may be determined depending upon the particular purpose.

Figure 2:
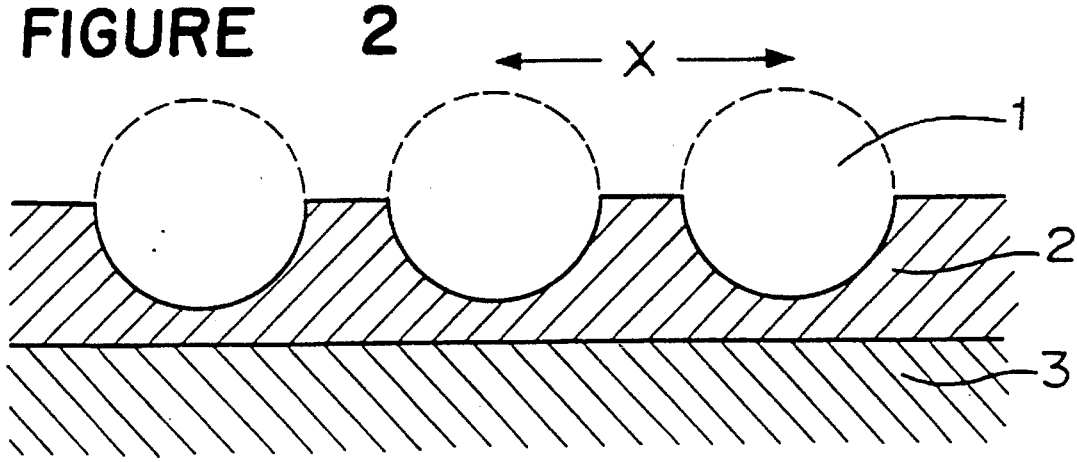
Figure 3:
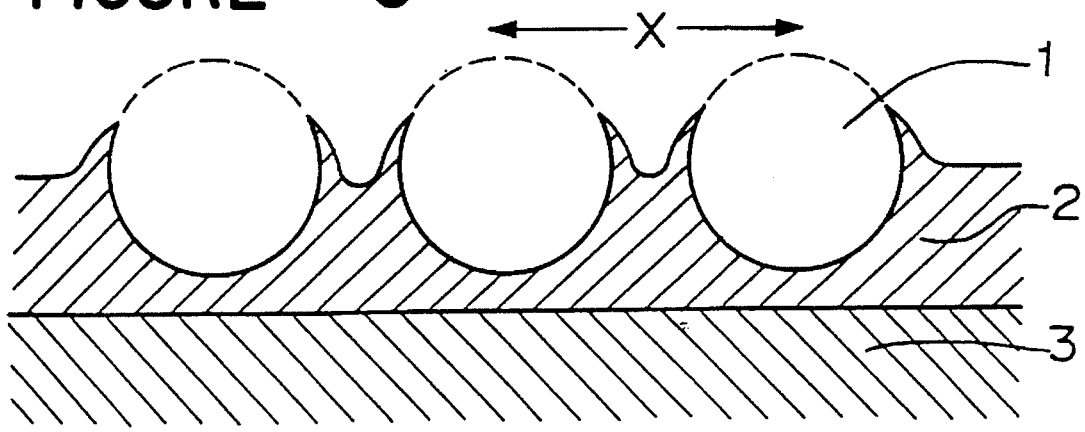

In the accompanying drawings, FIGS. 1 to 3 show cross sectional diagrammatical views of cases where the fine particles of a polymer are spherical. In the Figures, reference numeral 1 indicates fine particles of a polymer, numeral 2 a thin film layer of a heat resistant polymer, numeral 3 a substrate, and X an average distance between the centers of the concaves or valleys.

As a preferred form, the fine particles of a polymer are embedded to the film to some extent, followed by heat decomposition to form roughness, as shown in FIGS. 2 and 3.

As shown in FIG. 3, if the volume of the fine particles of a polymer embedded is at a certain level or more, raised portions like craters will be formed along the spherical particles, which contributes to the increase of the surface area, the reduction of the contact area with an abrading object and the increase of the effect for protecting the upper layer material and which is thus effective.

The compound (II) capable of forming a thin film of a heat resistant polymer may be a heat resistant polymer itself or a compound which is capable of forming a heat resistance polymer by e.g. polymerization at the time of the treatment. The heat resistant polymer formed by this compound (II) is required to be a material having a heat decomposition temperature higher than the heat decomposition temperature of the fine particles of a polymer. Particularly, it is preferably a material which undergo no chemical or physical change at the time of the heat decomposition of the fine particles of a polymer. The heat resistant polymer preferably has a heat decomposition temperature higher by at least 50° C. than the heat decomposition temperature of the fine particles of a polymer.

The compound (II) is the one capable of forming a thin film on the surface of e.g. a substrate at the time of the treatment. For example, the compound (II) dissolved or dispersed in the treating agent is required to form a heat resistant polymer thin film by removal of e.g. the solvent at the time of the treatment. Specifically, a solution or a dispersion of a heat resistant polymer itself or a compound capable of being cross-linked to form a heat resistant polymer, is used. Further, a solution or a dispersion of a compound capable of forming a heat resistant polymer by hydrolysis, such as a tetraalkoxysilane or its partial hydrolyzate, may also be used.

As the compound (II), the above-mentioned resin or the silicone resin useful as the material for the fine particles of a polymer may also be employed. The most preferred compound (II) is the above-mentioned reactive silane compound and its partial hydrolyzate. As such a reactive silane compound, a compound having no hydrophobic group is preferred among compounds of the above-mentioned formulas (A) and (B). Further, such a reactive silane compound may have an organic group having a functional group such as an epoxy group or an amino group.

The most preferred compound is a tetrafunctional reactive silane compound. Such a compound is a compound of the above formula (B) wherein e+g+h is 0, for example, a tetrafunctional reactive silane compound such as a tetraalkoxysilane or a tetraisocyanate silane.

The secondly preferred compound is a compound of the above formula (A) wherein a+b=c+d=0. Y is preferably an alkylene group having at most 6 carbon atoms and containing no fluorine atom. Further, a compound of the above formula (B) which contains no hydrophobic group, is also preferred. Likewise, a compound of the above formula (A) which contains no hydrophobic group, may also be used. Further, it is possible to employ the above compounds (I-A), (I-B) and (I-C) which give thin films with water repellency relatively lower than the compound (I) used for the first layer.

The compound (II) for forming the second layer is used preferably as diluted with a solvent together with the fine particles of a polymer and a binder, from the viewpoint of the operation efficiency. As the solvent, the above-mentioned organic solvent or the like may be used.

To the compound (II) for forming the second layer, other additives may be incorporated. Specifically, such additives include, for example, fillers such as fine particles of metal such as Sn, In, Al, Zn, Zr, Ti, Sb, Pb, Ta and Si or metal oxides thereof, and surfactants. Their proportions may suitably be from 0.01 to 20 wt % based on the total weight of the compounds (II).

For the surface treatment of the substrate, no special pretreatment is required. However, pretreatment may be conducted as the case requires. For example, acid treatment with e.g. diluted hydrofluoric acid or hydrochloric acid, alkali treatment with e.g. an aqueous sodium hydroxide solution, or discharge treatment by e.g. plasma irradiation, may be conducted.

Formulation of the second layer is not particularly limited. However, the second layer may usually be formed by applying a liquid composed of an organic solvent containing the compound (II) thus prepared, by a usual treating method, such as brush coating, casting, spin coating, dip coating or spray coating, followed by drying in air or in a nitrogen stream under heating. By this heat treatment, the fine particles of a polymer will undergo heat decomposition, whereby a roughened surface will be formed. Accordingly, the temperature for heating may be determined depending upon the heat resistance of the spherical polymer particles and the substrate. Usually, the treatment is conducted within a range of from 300° to 800° C.

The heat decomposition of the fine particles of a polymer by the heat treatment may not be complete, and an adequate effect of the present invention can be obtained even by partial heat decomposition, such that the fine particles of a polymer remain in the interior of the thin film of a heat resistant polymer.

There is no particular restriction as to the thickness of the second layer formed by this surface treatment. It may be very thin. A preferred film thickness is at most 2 μm like the case of the first layer. A too much film thickness is undesirable from the economical viewpoint and from the viewpoint of the scratch resistance and the quality of appearance.

As mentioned above, the degree of roughness of the second layer thus formed and the thicknesses of the respective layers can be optionally controlled by e.g. the concentration of the composition in the liquid containing the composition, the coating conditions, the heating conditions, and the material, the amount and size of the fine particles of a polymer.

The first layer of the present invention has a relatively low refractive index, whereby low reflecting properties may be imparted. If such an effect is desired, the thickness of the first layer may be adjusted to a thickness where an optical interference will occur. Theoretically, the thickness of the coating film may be at least the thickness of a single molecular layer to obtain water repellency. Taking an economical effect into consideration, the thickness is preferably at most 2 μm, as mentioned above.

There is no particular restriction as to the substrate to which the present invention may be applied. For example, a metal, a plastic, glass, ceramic or other inorganic materials, an organic material, or a combination thereof (composite material, laminated material, etc.) may be mentioned. Further, the surface of the substrate may, of course, be the substrate surface itself, or may be the surface of a material different from the substrate surface, such as the coating surface of e.g. a coated metal plate, or the surface of a surface-treated layer of e.g. surface-treated glass. With respect to the shape of the substrate, it may not necessarily be a flat plate, and it may have an optional shape depending upon the particular purpose, such as the one having a curvature over the entire surface or at a part thereof.

In the present invention, a particularly suitable substrate is a substrate made of a transparent material such as glass, and a suitable article is an article having such a substrate mounted to utilize the transparency. Thus, the substrate of the present invention is particularly suitable for articles for transportation equipments and articles for buildings or building decorations.

Articles for transportation equipments may be exterior parts such as outer plates, window glasses, mirrors and display panels, and interior parts such as instrument panels, of the transportation equipments such as electric cars, buses, trucks, automobiles, ships or aircrafts, or parts or constituting elements to be used in other transportation equipments.

For example, the articles for transportation equipments include bodies, window glasses, pantagraphs, etc. of electric cars, bodies, front glasses, side glasses, rear glasses, mirrors, bumpers, etc. of automobiles, buses or trucks, bodies, window glasses, etc. of ships, and bodies, window glasses, etc. of aircrafts.

Such an article may be composed solely of the surface-treated substrate or may have the surface-treated substrate incorporated therein. For example, the former may be a window glass for an automobile, and the latter may be a back mirror for an automobile in which a glass mirror is incorporated.

With such substrates or articles, water drops on the surface will be repelled by the water repellency. Especially, in operation, due to the interaction with the receiving wind pressure, water drops rapidly move on the surface and will not remain as water drops, whereby any adverse effect which may otherwise be induced by moisture, can be eliminated. Especially in the application to a see-through portion such as a window glass, it becomes easy to secure a viewing field due to dissipation of water drops, thus leading to improvement of the safety of a vehicle. Further, in an environment where water drops usually freeze, no freezing takes place, or even if freezing takes place, the frozen drops can readily be defrosted. Further, there will be no substantial deposition of water drops, whereby the number of periodical cleaning operations can be reduced. Besides, the cleaning operation is very easy, such being advantageous also for the protection of good appearance.

Further, the articles for buildings or building decorations may be articles to be attached to buildings or articles already attached to buildings, or articles for buildings which are not attached to buildings but which are used for the buildings, articles for buildings such as furnitures or equipments, and base materials (such as glass plates) constituting such articles.

Specifically, they include window glass plates, window glasses, glass plates for roofs, various roofs including glass roofs, glass plates for doors or doors having such glass plates installed, glass plates for partitions, glass plates for green houses, or green houses having such glass plates, transparent plastic plates to be used instead of glass, the above-mentioned various articles for buildings (window materials and roof materials) having such plastic plates incorporated, wall materials made of ceramics, cement, metals or other materials, mirrors, furnitures and display shelves having such walls or mirrors, and glass for showcases.

Such an article may be made of the surface treated substrate alone or may be the one having the surface treated substrate incorporated therein. For example, the former may be a window glass plate, and the latter may be a furniture in which a glass mirror is incorporated.

With such a surface treated substrate, water drops which are brought in contact with the surface are repelled due to the water repellency and scarcely attach to the surface, or if attached, the amount is small and the attached water drops can easily be removed. Further, even in an environment where water drops usually freeze, no freezing takes place, or even if freezing takes place, the frozen drops can readily be defrosted. Further, there will be no substantial deposition of water drops, whereby the number of periodical cleaning operations can be reduced, and each cleaning operation will be very easy, and such being advantageous also from the viewpoint of the protection of good appearance.

Now, the present invention will be described in further detail with reference to Examples. However, it should be understood that the present invention is by no means restricted to such specific Examples.

The methods for various evaluation tests on glass substrates having coating films formed in the following Examples and Comparative Examples and having water repellency and stain-proofing properties are as follows. The water repellency after each test was evaluated by measuring the contact angle.

1. Method for measuring the contact angle

The contact angle (°) of a water drop having a size of 1 mm in diameter was measured. Measurements were made at five different points on the surface, and the contact angle was represented by the average value.

2. Abrasion resistance test

Tester: Reprocation-type abrasion tester (manufactured by KNT). Test condition: Flannel cloth, load: 1 kg, 10,000 times.

The abrasion test was carried out by the above test method, and the water repellency after the test was evaluated.

3. Weather resistance test

A process comprising ultraviolet irradiation for 8 hours (70° C.) and humidity exposure for 4 hours (50° C.) is regarded as one cycle, and the weather resistance was conducted by 200 cycles.

The weather resistance test was conducted by the above method, and the water repellency after the test was evaluated.

4. Boiling test

A test sample was immersed in boiling water for one hour. The water repellency after the test was evaluated.

5. Compounds used (A) $C_9F_{19}C_2H_4Si(OCH_3)_3$
(B) $(CH_3O)_3SiC_2H_4C_6F_{12}C_2H_4Si(OCH_3)_3$
(C) $Si(OC_2H_5)_4$
(D) $C_8F_{17}C_2H_4Si(NCO)_3$
(E) $C_{18}H_{37}Si(NCO)_3$
(F) $Si(NCO)_4$
(G) $(C_8F_{17}C_2H_4)(NCO)_2SiOSi(C_8F_{17}C_2H_4)(NCO)_2$
(H) $(C_8F_{17}C_2H_4)(NCO)_2SiOSi(NCO)_3$

PREPARATION EXAMPLE 1

Into a container equipped with a stirrer and a thermometer, 260.2 g of hexylene glycol was introduced, and then 18.8 g of compound (C), 18.0 g of a 1 wt % hydrochloric acid aqueous solution, and 3.0 g of fine particles of polystyrene having an average particle size of 70 nm were sequentially added thereto. The mixture was stirred at 30° C. for 30 minutes and left to stand for one day to obtain treating agent 1.

PREPARATION EXAMPLE 2

Into a container equipped with a stirrer and a thermometer, 260.2 g of hexylene glycol was introduced, and then 18.8 g of compound (C), and 18.0 g of a 1 wt % hydrochloric acid aqueous solution were sequentially added thereto. The mixture was stirred at 30° C. for 30 minutes and then left to stand for one day to obtain treating agent 2.

PREPARATION EXAMPLE 3

Into a container equipped with a stirrer and a thermometer, 803.9 g of ethanol was introduced, and then 104.2 g of compound (C), 71.9 g of a 1 wt % hydrochloric acid aqueous solution and 20.0 g of fine particles of polymethyl methacrylate having an average particle size of 150 nm were sequentially added thereto. The mixture was stirred at 30° C. for 30 minutes and then left to stand for one day to obtain treating agent 3.

PREPARATION EXAMPLE 4

Into a container equipped with a stirrer and a thermometer, 246.8 g of isopropyl alcohol was introduced, and then 2.6 g of compound (A), 5.0 g of compound (B), 2.0 g of compound (C) and 2.2 g of a 1 wt % hydrochloric acid aqueous solution were sequentially added thereto. The mixture was stirred at 30° C. for 60 minutes and then left to stand for 5 days to obtain treating agent 4.

PREPARATION EXAMPLE 5

Into a container equipped with a stirrer and a thermometer, 270.3 g of isobutyl acetate was introduced, and then 27.0 g of compound (D), 3.0 g of compound (E) and 0.6 g of compound (F) were sequentially added thereto. The mixture was stirred at 25° C. for 10 minutes to obtain treating agent 5.

PREPARATION EXAMPLE 6

Into a container equipped with a stirrer and a thermometer, 834.8 g of hexylene glycol was introduced, and then 40.0 g of a dispersion of fine particles of polymethyl methacrylate having an average particle size of 80 nm, 62.5 g of ethyl silicate 40 and 62.4 g of a 1 wt % hydrochloric acid aqueous solution were sequentially added thereto. The mixture was stirred at 30° C. for 30 minutes and then left to stand for one day to obtain treating agent 6.

PREPARATION EXAMPLE 7

Into a three-necked flask equipped with a stirrer and a thermometer, 1.0 g of compound (G) and 99.0 g of freon 225 were added and stirred for one hour. While maintaining the temperature of this solution at 25° C., stirring was continued for one day to obtain treating agent 7.

PREPARATION EXAMPLE 8

Into a three-necked flask equipped with a stirrer and a thermometer, 1.0 g of compound (H) and 99.0 g of freon 225 were added and stirred for one hour. While maintaining the temperature of this solution at 25° C., stirring was continued for one day to obtain treating agent 8.

PREPARATION EXAMPLE 9

Into a three-necked flask equipped with a stirrer and a thermometer, 3.0 g of compound (D) and 97.0 g of ethyl acetate were added and stirred for one hour. While maintaining the temperature of this solution at 25° C., stirring was continued for one day to obtain treating agent 9.

PREPARATION EXAMPLE 10

Into a container equipped with a stirrer and a thermometer, 834.8 g of hexylene glycol were introduced, and then 40.0 g of a dispersion of fine particles of polymethyl methacrylate having an average particle size of 80 nm, 120.5 g of a dispersion of fine particles of tin oxide sol having an average particle size of 5 nm, 62.5 g of ethyl silicate 40 and 62.4 g of a 1 wt % hydrochloric acid aqueous solution were sequentially added thereto. The mixture was stirred at 30° C. for 30 minutes and then left to stand for one day to obtain treating agent 10.

EXAMPLE 1

On a glass substrate previously polished by cerium oxide and cleaned, treating agent 1 was coated by a flexographic printing method and subjected to heat treatment in a muffle furnace at 600° C. for 10 minutes. After the heat treatment, the substrate was withdrawn from the muffle furnace and cooled to room temperature. Then, this substrate was dipped in treating agent 4 and withdrawn therefrom at a rate of 6 cm/min, whereupon it was subjected to heat treatment at 200° C. for 30 minutes to obtain a sample test piece. This sample test piece was evaluated, and the results are shown in Table 1.

EXAMPLE 2

On a glass substrate previously polished by cerium oxide and cleaned, treating agent 3 was coated by a spin coating method and subjected to heat treatment in a muffle furnace at 650° C. for 10 minutes. After the heat treatment, the substrate was withdrawn from the muffle furnace and cooled to room temperature. Then, this substrate was dipped in treating agent 4 and withdrawn at a rate of 6 cm/min, whereupon it was subjected to heat treatment at 200° C. for 30 minutes to obtain a sample test piece. This sample test piece was evaluated, and the results are shown in Table 1.

EXAMPLE 3

On a glass substrate previously polished by cerium oxide and cleaned, treating agent 1 was coated by a flexographic printing method and subjected to heat treatment in a muffle furnace at 600° C. for 10 minutes. After the heat treatment, the substrate was withdrawn from the muffle furnace and cooled to room temperature. Then, to this substrate, treating agent 5 was dropped and coated in the same manner as waxing, followed by drying at room temperature for 60 minutes to obtain a sample test piece. This sample test piece was evaluated, and the results are shown in Table 1.

EXAMPLE 4

On a glass substrate previously polished by cerium oxide and cleaned, treating agent 3 was coated by a dip coating method and subjected to heat treatment in a muffle furnace at 650° C. for 10 minutes. After the heat treatment, the substrate was withdrawn from the muffle furnace and cooled to room temperature. Then, to this substrate, treating agent 5 was dropped and coated in the same manner as waxing, followed by drying at room temperature for 60 minutes to obtain a sample test piece. This sample test piece was evaluated, and the results are shown in Table 1.

EXAMPLE 5

On a glass substrate previously polished by cerium oxide and cleaned, treating agent 3 was coated by a flexographic printing method and subjected to heat treatment in a muffle furnace at 650° C. for 10 minutes. After the heat treatment, the substrate was withdrawn from the muffle furnace and cooled to room temperature. Then, to this substrate, treating agent 7 was dropped and coated in the same manner as waxing, followed by drying at room temperature for 60 minutes to obtain a sample test piece. This sample test piece was evaluated, and the results are shown in Table 1.

EXAMPLE 6

On a glass substrate previously polished by cerium oxide and cleaned, treating agent 6 was coated by a flexographic printing method and subjected to heat treatment in a muffle furnace at 650° C. for 10 minutes. After the heat treatment, the substrate was withdrawn from the muffle furnace and cooled to room temperature. Then, to this substrate, treating agent 8 was dropped and coated in the same manner as waxing, followed by drying at room temperature for 60 minutes to obtain a sample test piece. This sample test piece was evaluated, and the results are shown in Table 1.

EXAMPLE 7

On a glass substrate previously polished by cerium oxide and cleaned, treating agent 6 was coated by a flexographic printing method and subjected to heat treatment in a muffle furnace at 650° C. for 10 minutes. After the heat treatment, the substrate was withdrawn from the muffle furnace and cooled to room temperature. Then, to this substrate, treating agent 9 was dropped and coated in the same manner as waxing, followed by drying at room temperature for 60 minutes to obtain a sample test piece. This sample test piece was evaluated, and the results are shown in Table 1.

COMPARATIVE EXAMPLE 1

On a glass substrate previously polished by cerium oxide and cleaned, treating agent 2 was coated by a flexographic printing method and subjected to heat treatment in a muffle furnace at 600° C. for 10 minutes. After the heat treatment, the substrate was withdrawn from the muffle furnace and cooled to room temperature. Then, this substrate was dipped in treating agent 4 and withdrawn at a rate of 6 cm/min, whereupon it was subjected to heat treatment at 200° C. for 30 minutes to obtain a sample test piece. This sample test piece was evaluated, and the results are shown in Table 1.

COMPARATIVE EXAMPLE

A glass substrate previously polished by cerium oxide and cleaned, was dipped in treating agent 4 and withdrawn at a rate of 6 cm/min, whereupon it was subjected to heat treatment at 200° C. for 30 minutes to obtain a sample test piece. This sample test piece was evaluated, and the results are shown in Table 1.

TABLE 1

| Examples | Contact angle (°) | | | |
|---|---|---|---|---|
| | Initial | Boiling | Abrasion resistance | Weather resistance |
| Example 1 | 110 | 102 | 104 | 100 |
| Example 2 | 110 | 104 | 102 | 102 |
| Example 3 | 114 | 108 | 107 | 107 |
| Example 4 | 115 | 108 | 108 | 106 |
| Example 5 | 117 | 113 | 110 | 110 |
| Example 6 | 117 | 112 | 111 | 110 |
| Example 7 | 115 | 109 | 109 | 108 |
| Comparative Example 1 | 110 | 77 | 30 | 88 |
| Comparative Example 2 | 114 | 82 | 54 | 48 |

It was confirmed by Examples 1 to 7 that the glass products of the present invention had excellent water repellency, adhesion, abrasion resistance and weather resistance.

Further, it was confirmed that with the glass products having a construction containing no fine particles of a polymer as an essential component of the present invention (Comparative Example 1) and a construction having no underlayer (Comparative Example 2), the adhesion, the abrasion resistance and the weather resistance were inadequate.

EXAMPLE 8

The test piece prepared in Example 4 was dipped in the reagent as identified in Table 2 for 24 hours, withdrawn and immediately washed, and then the change in appearance and the water repellency of this test piece were evaluated. The results are shown in Table 2.

TABLE 2

| Reagent | Change in appearance | Contact angle (°) |
|---|---|---|
| Methanol | No change | 112 |
| Acetone | No change | 112 |
| Toluene | No change | 112 |
| Water | No change | 111 |
| 1% sulfuric acid aqueous solution | No change | 112 |
| 1% sodium hydroxide aqueous solution | No change | 110 |
| Commercial cleanser | No change | 110 |
| Gasoline | No change | 112 |

As is apparent from the above Table, it was confirmed that the glass products of the present invention are excellent in the chemical resistance.

EXAMPLE 9

Treatment of the surface of a laminated front glass for an automobile was conducted in the same manner as in Example 5, and the front glass thus treated was mounted on an automobile. Thus automobile was subjected to a running test for 4 hours during day time every day for one month, and the deposition of dust and stain on the surface of the front glass, or in a rainy day, the deposition of water, drops, was visually observed every day.

As a result, no deposition of dust or stain, or no formation of fur due to deposition of water drops, was observed, or even when observed, it was readily removed by gently wiping it off with a tissue paper. Further, at the time of raining, water drops on the surface were repelled and moved away swiftly by the interaction with the wind pressure due to running, whereby the viewing field was secured without using a wiper. Further, in a running test in an environment (0° C. to −5° C.) where water drops deposited on a non-treated laminated front glass would freeze, or moisture in air would condense to form frost on a front glass, no formation of frost on the front glass was observed.

In a severer low temperature environment (−10° C. to −15° C.), formation of frost on the front glass was observed, but defrosting was quick, and there was a substantial difference as compared with the non-treated front glass.

EXAMPLE 10

The running test was conducted in the same manner as in Example 9 except that the method of Example 5 was changed to the method of Example 7, whereby the same effects as in Example 9 were confirmed.

EXAMPLE 11

The running test was conducted in the same manner as in Example 9 except that the laminated front glass in Example 9 was changed to a side glass or a rear glass, whereby the same effects as in Example 9 were confirmed.

EXAMPLE 12

The running test was conducted in the same manner as in Example 9 except that the laminated front glass in Example 9 was changed to a side mirror, whereby the same effects as in Example 9 was confirmed.

EXAMPLE 13

Coating on the surface of a window glass for building was conducted in the same manner as in Example 9 to form a coating film. The window glass thus obtained was mounted on a house. The deposition of dust and stain on the surface of this window glass, or in a rainy day, the deposition of water drops, was visually observed every day.

As a result, no deposition of dust or stain, or no formation of fur due to deposition of water drops, was observed, or even when observed, it was readily be removed by gently wiping it off with a tissue paper. Further, at the time of rain, water drops on the surface were repelled and fell off, and especially when strong wind blew, water drops were readily moved off by the interaction with the wind pressure, whereby the viewing field was secured. Further, in a test under an environment (0° C. to −5° C.) where water drops deposited on a non-treated window glass would freeze, or moisture in air would condense to form frost on a window glass, no formation of frost on the window glass was observed.

In a severer low temperature environment (−10° C. to −15° C.), formation of frost on the window glass was observed, but the defrosting was quick, and there was a substantial difference as compared with the non-treated window glass.

EXAMPLE 14

On a glass substrate previously polished by cerium oxide and cleaned, treating agent 10 was coated by a flexographic printing method and subjected to heat treatment in a muffle furnace at 650° C. for 10 minutes. After the heat treatment, the substrate was withdrawn from the muffle furnace and cooled to room temperature. Then, to this substrate, treating agent 7 was dropped and coated in the same manner as waxing, followed by drying at room temperature for 60 minutes to obtain a sample test piece. The surface resistance of this sample test piece was $3\times10^8$ Ω/o as measured by MCP-TESTER, manufactured by Mitsubishi Petrochemical Co., Ltd. Further, the same sample was evaluated, and the results are shown in Table 3.

TABLE 3

| Examples | Contact angle (°) | | | |
| --- | --- | --- | --- | --- |
| | Initial | Boiling | Abrasion resistance | Weather resistance |
| Example 14 | 114 | 109 | 104 | 101 |

Thus, it was confirmed possible to incorporate an electrically conductive material to the treating agent of the present invention and to impart electrical conductivity by such incorporation of an electrically conductive material. Further, it was confirmed that even when the electrically conductive material was incorporated, the glass product of the present invention had excellent water repellency, adhesion, abrasion resistance and weather resistance.

In Example 14, an electrically conductive material is exemplified as the additive. However, the glass product of the present invention provides the equal performance even when the electrically conductive material is substituted by other additives.

The substrate of the present invention or an article provided therewith exhibits excellent effects as is apparent from the Examples. Namely:

1. It is excellent in the water repellency and free from deposition of dust, stain or water drops, or free from formation of fur due to such deposition. Even if observed, such deposition can readily be removed, whereby adverse effects resulting from water can be prevented, and cleaning operation can be simplified.

2. It is excellent in maintaining the water repellency and is capable of maintaining such a condition semi-permanently.

3. It is excellent in chemical resistance and can be applied at a region along sea coast or at a region where sea water is directly in contact. Thus, it is applicable in a wide range of fields.

4. The water repellency is most suitable for use in the field of transportation equipments and in the field of buildings and building decorations.

The above effects can not be expected with conventional materials, and the present invention is expected to be applied in an area where the conventional materials could not be practically used.

What is claimed is:

1. A surface-treated substrate consisting essentially of a substrate having at least two treated surface layers wherein the first layer constituting the outermost layer among the treated surface layers is a layer formed by treating with a treating agent containing a compound (I) capable of forming a surface having a contact angle of at least 70° against water, and the second layer constituting an underlayer in contact with the outermost layer is a film layer of a heat resistant polymer formed by treating with a treating agent containing a compound (II) capable of forming a film of a heat resistant polymer and fine particles having an average particle size of from 1 to 1,000 nm of a polymer, to form a film and heating the film to thermally decompose the fine particles of a polymer.

2. The substrate according to claim 1, wherein the substrate is made of a transparent material.

3. The substrate according to claim 1, wherein the substrate is made of glass.

4. The substrate according to claim 1, wherein the substrate is a part of a transportation equipment.

5. The substrate according to claim 1, wherein the substrate is a part of a building material of a building decoration.

6. The substrate according to claim 1, wherein the substrate is a substrate having at least one film selected from the group consisting of an antistatic film, a transparent electrically conductive film, an electromagnetic wave shielding film, an ultraviolet absorbing film, a heat ray absorbing film and a heat ray reflecting film.

7. The substrate according to claim 1, wherein the compound (I) is a reactive silane compound having at least one silicon atom having an isocyanate group and/or a hydrolyzable group bonded thereto and at least one hydrophobic group.

8. The substrate according to claim 7, wherein the hydrophobic group is a polyfluoroorganic group and/or a $C_7$–$C_{20}$ long chain hydrocarbon group.

9. The substrate according to claim 8, wherein the polyfluoroorganic group is an organic group having a $C_{3-21}$ perfluoroalkyl moiety or a $C_{2-16}$ perfluoroalkylene moiety, and the long chain hydrocarbon group is a hydrocarbon group having a $C_{7-30}$ alkyl moiety or a $C_{7-16}$ alkylene moiety.

10. The substrate according to claim 1, wherein the compound (I) is at least one reactive silane compound of the following formula (A), (B) or (C) wherein at least one organic group is a hydrophobic group:

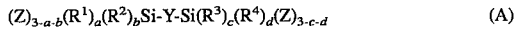
$$(Z)_{3-a-b}(R^1)_a(R^2)_b\text{Si-Y-Si}(R^3)_c(R^4)_d(Z)_{3-c-d} \quad (A)$$

wherein each of $R^1$, $R^2$, $R^3$ and $R^4$ which are independent of one another, is hydrogen, a hydroxyl group, an amino group or a $C_{1-30}$ organic group, Y is a bivalent organic group, Z is an isocyanate group and/or a hydrolyzable group, each of a and b which are independent of each other, is an integer of 0, 1 or 2, provided $0 \leq a+b \leq 2$, and each of c and d which are independent of each other, is an integer of 0, 1 or 2, provided $0 \leq c+d \leq 2$,

$$(R^5)_e(R^6)_g(R^7)_h\text{Si}(Z)_{4-e-g-h} \quad (B)$$

wherein each of $R^5$, $R^6$ and $R^7$ which are independent of one another, is hydrogen, a hydroxyl group, an amino group or a $C_{1-30}$ organic group, provided that at least one of $R^5$, $R^6$ $R^7$, and is an organic group, Z is an isocyanate group and/or a hydrolyzable group, and each of e, g and h which are independent of one another, is an integer of 0, 1 or 2, provided $1 \leq e+g+h \leq 3$,

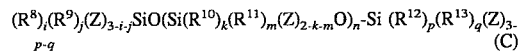
$$(R^8)_i(R^9)_j(Z)_{3-i-j}\text{SiO}(\text{Si}(R^{10})_k(R^{11})_m(Z)_{2-k-m}O)_n\text{-Si}(R^{12})_p(R^{13})_q(Z)_{3-p-q} \quad (C)$$

wherein each of $R^8$ to $R^{13}$ which are independent of one another, is hydrogen, a hydroxyl group, an amino group or a $C_{1-30}$ organic group, provided that at least one of $R^8$ to $R^{13}$ is an organic group, Z is an isocyanate group and/or a hydrolyzable group, each of i and j which are independent of each other, is an integer of 0, 1 or 2, provided $1 \leq i+j \leq 3$, each of k and m which are independent of each other, is an integer of 0, 1 or 2, provided $0 \leq k+m \leq 2$, each of p and q which are independent of each other, is an integer of 0, 1 or 2, provided $1 \leq p+q \leq 3$, provided $i+j+k+m+p+q \leq 7$, and n is an integer of $0 \leq n$ representing the number of repeating units.

11. The substrate according to claim 10, wherein the hydrophobic group is a polyfluoroorganic group and/or a $C_7$–$C_{20}$ long chain hydrocarbon group.

12. The substrate according to claim 11, wherein the polyfluoroorganic group is an organic group having a $C_{3-21}$ perfluoroalkyl moiety or a $C_{2-16}$ perfluoroalkylene moiety, and the long chain hydrocarbon group is a hydrocarbon group having a $C_{7-30}$ alkyl moiety or a $C_{7-16}$ alkylene moiety.

13. The substrate according to claim 1, wherein the compound (II) is a reactive silane compound having an isocyanate group and/or a hydrolyzable group.

14. The substrate according to claim 1, wherein the compound (II) is a tetraisocyanate silane and/or a tetraalkoxysilane.

15. The substrate according to claim 1, wherein the treating agent for forming the second layer contains fine particles of a metal and/or a metal oxide.

16. The substrate according to claim 1, made by a process which comprises treating the surface of a substrate with a treating agent containing a compound (II) capable of forming a film of a heat resistant polymer and fine particles having an average particle size of from 1 to 1,000 nm of a polymer, to form a film, heating the film to thermally decompose the fine particles of a polymer to form a film layer of a heat resistant polymer, and then treating the surface of the film layer of a heat resistant polymer with a treating agent containing a compound (I) capable of forming a surface having a contact angle of at least 70° against water.

* * * * *